United States Patent [19]
Horn

[11] Patent Number: 5,661,786
[45] Date of Patent: Aug. 26, 1997

US005661786A

[54] ELECTRONIC INFORMATION LOCKOUT DEVICE

[76] Inventor: Douglas Horn, 6720 Wickliff Trail, Plano, Tex. 75023

[21] Appl. No.: 699,622

[22] Filed: Aug. 19, 1996

[51] Int. Cl.$^6$ .................................................. H04M 11/00
[52] U.S. Cl. ............................................. 379/99; 379/445
[58] Field of Search ........................... 379/99, 95, 445, 379/446, 437, 438

[56] References Cited

U.S. PATENT DOCUMENTS

| | | | |
|---|---|---|---|
| 4,311,883 | 1/1982 | Kidney | 379/445 |
| 4,446,708 | 5/1984 | Ely | 379/445 |
| 4,584,856 | 4/1986 | Petersdorff et al. | 379/445 |
| 5,448,630 | 9/1995 | Barstow | 379/445 |

*Primary Examiner*—Wing F. Chan
*Attorney, Agent, or Firm*—Wood, Herron & Evans, LLP

[57] ABSTRACT

A lockout system for preventing children from accessing parentally-restricted and undesirable electronic information through an interface device of a computer comprises a signal cable connected at one end with a signal port and at the other end with an interface device of a computer through an opening in a case of the computer, so electronic information may pass back and forth between the interface device and port and a locking device coupled in-line with the signal cable. The locking device, when actuated, disables the signal cable to prevent electronic information from passing between the interface device and port so that children cannot gain access to information prohibited by parents. A protective collar is configured for engaging the computer body proximate the opening in the case and maintaining the other end of the signal cable in operable connection with the interface device to hinder a bypass of the lockout system.

19 Claims, 3 Drawing Sheets

ELECTRONIC INFORMATION LOCKOUT DEVICE

FIELD OF THE INVENTION

This invention relates generally to a system and method for preventing children from accessing parentally-restricted electronic information through their computers, and is specifically related to preventing children from accessing pornography and other undesirable information over the Internet.

BACKGROUND OF THE INVENTION

With the relatively recent advent of widespread access to on-line computer information and services, collectively referred to as the Internet, computer users are able to obtain a wide variety of information, which is delivered directly into their homes. All that is necessary to access the Internet is a computer with modem or interfacing capability, a telephone line, and a telephone port or jack.

To meet the demand for Internet information, there has also been a proliferation of Internet services and access software packages which allow a user to move through or browse the available on-line options. This has made it very easy for users to obtain the information they need. Internet users are not only adults, but children as well, and ironically, children, as a class, are probably more computer literate than many adults due to the great amount of exposure to computers that children now receive at an early age. The user-friendly atmosphere of the Internet allows children with even minimal computer skills to access information at defined "sites" which are related to a particular topic.

Unfortunately, not all information sites contain material which is suitable for children. Pornographic material, for example, is abundant on the Internet, and children can access and view pornographic pictures much the same way that they might view pictures in a pornographic magazine. While access to magazines and other printed materials is limited to adults, access to Internet pornography is not so limited. As may be appreciated child access to pornography through the Internet is an alarming concern for parents and other adults, such as educators, who do not want their own children or children in their care exposed to pornography.

Additionally, pornographic materials and sites are not the only informational avenues to which parents and other adults would like to restrict their childrens' access. The Internet also provides access to information regarding body piercing, child pornography, violent topics, and other similar information which would be detrimental to the proper mental and physical development of a child. Seemingly innocuous chat groups on the Internet may also expose a child to harmful adult topics. Chat groups are not only mentally dangerous to children but also physically dangerous, as evidenced by a recent incident wherein a child was abducted by a pedophile who he met and talked with over the Internet.

Therefore, parents and other adults have a substantial interest in preventing children from accessing the Internet through their computers. This is becoming ever more difficult, since personal and home computers are very popular and are becoming more widespread, much the same way that television did in the 1950's and 1960's. Parents' frustrations are further exacerbated by the fact that personal computers are usually placed in a home office, bedroom, or other designated room and are not readily visible to a supervising adult. A child may be accessing parentally-restricted information right under the nose of a parent.

While censorship efforts have been made to prevent certain categories of materials from appearing on or being accessible through the Internet, they have been generally unsuccessful. Despite the possible harm to children from these materials, First Amendment arguments and concerns have prevented the removal of the above-discussed material from the Internet. Furthermore, since adults and children share the same access to such materials, widespread database prevention for children at the source will inevitably prevent adults access to information which arguably should be available to them. Therefore, parents and other adults are left with the task of preventing children from accessing certain Internet materials.

Furthermore, not only are parents and adults interested in preventing Internet access to potentially damaging and harmful materials, but they are also interested in preventing any additional Internet access at all. Since Internet access can cost money, an unsupervised child may run up large amounts of costs playing around on the Internet. Internet shopping is also a concern, as companies offer numerous products for sale over the Internet which require only a credit card number. In the case of some on-line services, they may already have the parent's credit card number and all that a child has to do is make the order. Not a few parents have been unpleasantly surprised by large telephone or credit card bills directly related to their child's access to the Internet. Finally, a parent may simply be interested in preventing a child from spending too much time on the computer to the detriment of their school work or other activities, such as sports.

A simple solution to preventing a child's access to the Internet would be to remove the computer and lock it away until a child may be supervised by an adult. Such a solution is not only impractical, but it is also inconvenient. Computers are usually bulky and heavy and are not easy to move around. Furthermore, the various peripherals such as printers, monitors and phone line connections will constantly have to be disconnected and then reconnected each time that the computer is to be used. Still further, removing the computer prevents adult use and non-Internet use. Computers are very useful tools and are used by adults and children alike for a number of constructive tasks such as accounting, document generation and homework. Locking the computer away prevents such constructive use. Even when the computer is to be constructively used, such as by a child for homework, most parents do not want to have to stand behind the child or even stay in the same room to prevent Internet access altogether or to prevent access to undesirable or adult materials.

Therefore, it is an objective of the present invention to assist parents and other adults in preventing a child's exposure to harmful and undesirable information available on the Internet.

It is another objective of the invention to restrict unsupervised access to the Internet to reduce the monetary costs associated therewith.

It is still another objective to provide to an adult such restrictive measures without substantial modification to or removal of a computer to allow constructive use of a computer by a child.

It is another objective to provide assistance to adults in a relatively inexpensive and easily understood manner so that restrictive measures may be implemented without substantial financial or time expenditures by an adult.

It is still another objective to restrict a child's access to the Internet in a way which is not easily or readily overcome or bypassed by the child.

It is another objective to provide a parent the ability to restrict Internet access without knowing how to use a computer.

SUMMARY OF THE INVENTION

The above objectives and other objectives are met by the lock out system of the present invention which prevents children from accessing parentally-restricted and undesirable electronic information through an interface device of a computer, such as a modem card. The lock out system prevents exposure to undesirable information while maintaining the operational integrity of the computer so that it may be used for constructive purposes. The lock out system is relatively inexpensive and is easy to use and may be installed with a computer without a substantial amount of modification to the computer. The lock out system is not easily or readily bypassed by a child and provides a parent or other adult the ability to restrict Internet access without themselves intimately knowing how to use a computer.

More specifically, the lock out system of the invention comprises a locking device which is operably coupled in-line with a signal line, such as a telephone cable. The telephone cable extends between a signal port, such as a telephone jack, and an interface device in the computer, such as a modem card. The locking device is operable to decouple the modem card from the telephone jack, when actuated, to prevent electronic information and phone signals from passing between the modem card and the jack. In that way, children cannot gain access to on-line information through the Internet, when the locking device is actuated. Deactuating the locking device will provide the necessary connection between the modem card and the telephone jack so that access to the Internet may be achieved by an adult or an adult-supervised child.

In one embodiment of the invention, the locking device is a keyed switch which is mounted in-line with the cable and which may be opened and closed using a key. The key is turned to open the switch and then removed thereby leaving the switch open and effectively breaking the telephone cable between the modem card and telephone jack. Preferably, the keyed switch is contained within an enclosed case to prevent the child from physically bypassing the locking device.

The lock out system further comprises a protective mount structure which is couplable with both the telephone cable and the computer to prevent the telephone cable from being readily and easily removed by a child from the computer and replaced with another telephone cable that does not include the locking device. More specifically, a preferred embodiment of the protective mount structure comprises a protective collar having a body with an opening formed therethrough for passage of the telephone cable. The body of the collar is configured to allow the telephone cable to slide with respect thereto; however, the collar prevents passage of the plug at the end of the telephone cable through the collar. The collar thereby prevents the telephone cable plug from being unplugged from the modem card. Thus the collar secures the cable and locking device in place.

An embodiment of the collar comprises opposing tabs on either side of the collar body which are positioned proximate an inside surface of the slotted opening in the case of the computer which allows access to the modem card of the computer. The computer case must be opened or partially disassembled so that the collar may be placed on the inside thereof. The collar is positioned inside of the opened computer case, and the cable is threaded through the slotted opening. The cable is then plugged into the modem card at the end proximate the collar. When the modem card is then plugged into position in the computer, the collar abuts against the slot with the opposing tabs on either side of the slot preventing the collar from being drawn therethrough. With the collar held in this position, the plug of the telephone cable is covered and is maintained within the socket of the modem card. The computer case is then closed or reassembled. The plug is thereby covered and rigidly held plugged in the modem card, and may not be easily removed without damaging the modem card or disassembling the computer. Damage caused by a child to the modem card will effectively prevent Internet access, and disassembly of the computer would raise the suspicion of a parent or other adult that the child is trying to do something that they are not supposed to be doing, such as bypassing the lock out system.

The lock out system of the invention thereby assists parents and other adults in preventing a child's exposure to harmful and undesirable on-line information and reduces or eliminates the costs that might be associated therewith. The lock out system does not affect the stand-alone operational capability of the computer and only prevents access to information through a telephone line. Furthermore, all Internet access is not prevented, as the locking device may be deactuated by a parent or adult with the key. In that way, an adult may access on-line information or may supervise a child doing so. The lock out system is relatively inexpensive and may be installed quickly and easily without substantial modification to the computer equipment. Furthermore, the lock out system does not require the adult to be able to operate the computer. The lock out system is not easily or readily overcome or bypassed by the child without blocking or ruining the modem card or alerting an adult that a bypass attempt is underway so that it may be stopped.

While the lock out system of the present invention is preferably directed to computer modem use and telephone line access, it will be readily understood that other interface devices and signal capabilities might be utilized as well, and the lock out system is equally applicable to those technologies wherein access to on-line services is provided through a computer-based interface device. For example, on-line access utilizing ISDN cards, cable cards, or asynchronous transfer mode (ATMs) might also be prevented utilizing the present invention.

The objectives and benefits of the present invention will become more readily apparent from the brief description of the drawings and detailed description of the invention given below.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
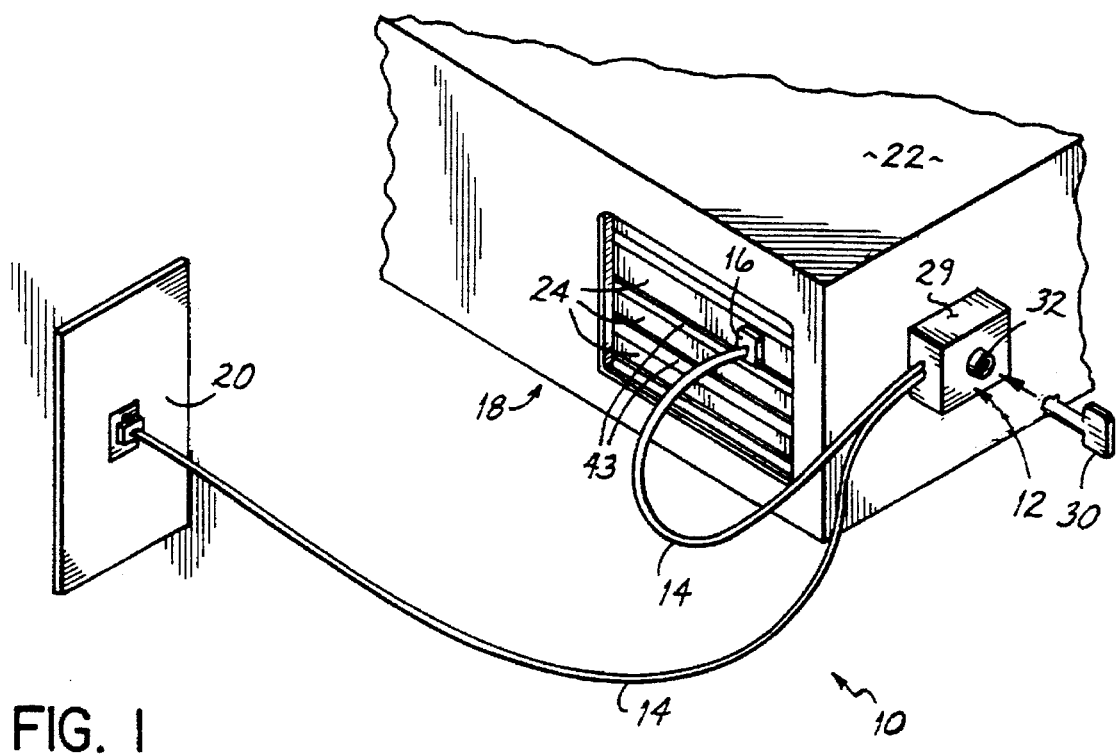
FIG. 1 is a perspective view of the lockout system of the invention coupled between a computer and a telephone jack.

FIG. 1 illustrates the lockout system 10 of the invention which comprises a locking device 12, a telephone cable 14, and a protective mount structure 16. The lockout system 10 is installed between a computer 18 and a signal port, such as telephone jack 20. When the locking device 12 is actuated, Internet access is prevented.

Computer 18 may be any suitable computer device, such as a personal computer, which utilizes a modem card for access to remote information sites, such as the Internet. Generally, such personal computers include an outer metal or plastic case 22 which surrounds the electronics of the computer. The case 22 will generally stand alone or will provide a base for mounting other equipment, such as a monitor (not shown). Case 22 includes a plurality of slotted openings 24 generally located at a rearward side thereof. The slotted openings 24 correspond to card ports which are located inside the computer and are configured to receive interface cards, such as a modem card for providing telephone line communication or a network card for connecting the computer 18 to communicate with other remote computers (not shown).

The lockout system 10 of the present invention will described herein for being used with a modem card. However, it should be understood that the lockout system will be equally applicable for other interface cards such as ISDN cards, cable cards and ATM cards to generally prevent unauthorized access to parentally-restricted electronic information.

The telephone jack 20 is a conventional jack used for telephone communication or data transfer in a computer network. Other signal ports might be utilized depending upon the interface device and the communication scheme as appropriate.

Figure 5:
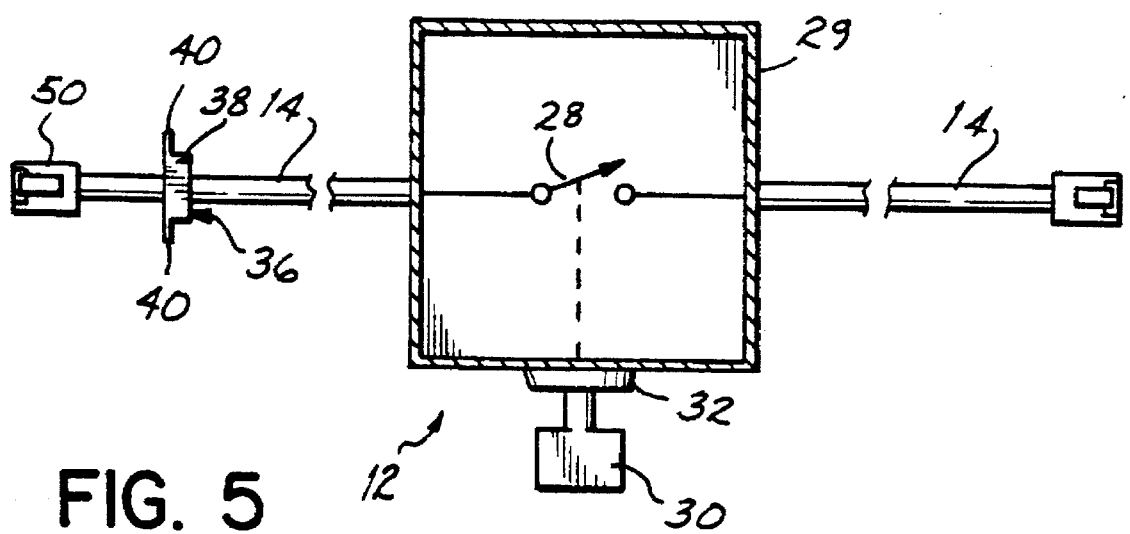

The present invention operates by decoupling computer 18 from the telephone jack 20 using locking device 12 and effectively preventing bypassing of the locking device 12 by a child. More specifically, a preferred embodiment of the locking device is schematically illustrated in FIG. 5 wherein a mechanical switch 28 such as a key-operated switch or keyed switch, is utilized for actuation and deactuation of the locking device 12. Keyed switch 28 is coupled in-line with telephone cable 14 and is opened and closed by turning an inserted key 30 in keyhole 32. The key switch 28 is operable such that when the switch is open, the cable is effectively opened and disabled. The key may then be removed so that a parent or other adult can keep it in a safe place away from a child. When switch 28 is opened, cable 14 is disabled and no communication can take place therethrough. To enable the cable 14, the key is inserted and turned to close the switch. As will be understood by a person of ordinary skill in the art, the switch may be arranged so that opening the switch enables the cable and closing the switch disables the cable.

Telephone cable 14 may have any number of wire conductors for carrying the necessary communication signals. A typical telephone line would have four conductors. Switch 28 may be effectively coupled in-line with telephone cable 14 by routing at least one of the operative conductors through the switch while allowing one or more of the other operative conductors to be unswitched. Alternatively, all of the conductors of cable 14 might be operably coupled through the keyed switch 28. Therefore, Internet access may be prevented by using key 30 and an adult does not have to have any particular computer knowledge. As mentioned, the locking device may be deactuated by using key 30 to close switch 28 and thereby enable telephone cable 14. Therefore, only unsupervised access to the Internet is prevented while adult access or access by a supervised child is still available.

Figure 2:
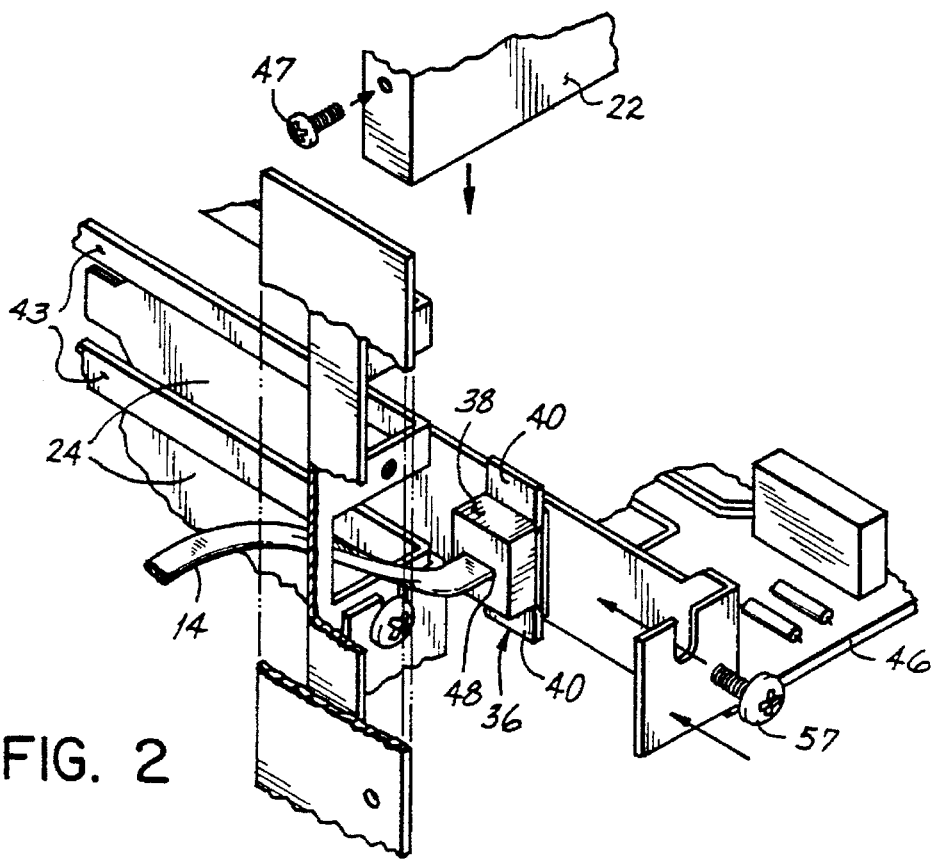
FIG. 2 is a disassembled view of the lockout system of the invention being installed with a modem card of a computer.

The lockout system 10 of the present invention is easy to install and may not be readily bypassed by a child. Referring to FIG. 2, a preferred embodiment of the protected mount structure to be used is illustrated. Protective collar 36 is coupled to cable 14 and prevents the cable, including the lock device 12, from being unplugged from the modem card of a computer. More specifically, collar 36 includes a body portion 38 and opposing tabs 40 extending on opposite sides thereof. The collar body 38 is configured to be positioned in a slot 24 formed in a backplate 43 of the computer case 22. To install protective collar 38, the computer case 22 is opened or disassembled as appropriate to provide access to the inside 45 of the case and particularly to provide access to a modem board 46 therein (see FIGS. 2 and 4).

For example, backplate 43 might be removed such as by removing screws 47 or other fasteners from the case and then removing the backplate. Cable 14 including plug 50 and collar 38 are then threaded through slot 24 and into the inside 45 of the computer. The modem board 46 is preferably unplugged from its respective expansion slot (not shown) to facilitate the connection of the lockout system.

Figure 3:
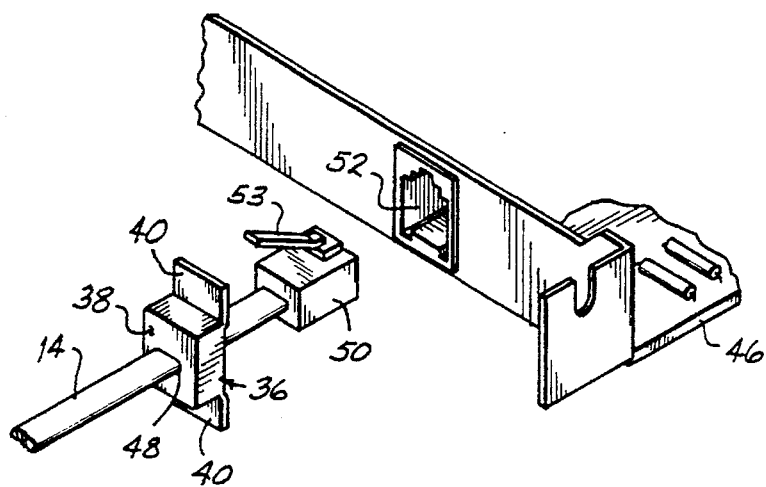
FIG. 3 is an enlarged view showing the protective mount structure of the invention engaging a modem card and covering the telephone cable plug.

Referring to FIG. 3, modem board 46 includes an input port 52 for receiving plug 50. Plug 50 is preferably a traditional telephone plug including a screwing or locking structure 53 thereon which will hold the plug in place once it is inserted into port 52. The securing structure snaps into a designated slot in port 52 and may be bent down to unplug the plug 50. As mentioned, to facilitate insertion of plug 50 and the positioning of collar 36, the expansion slot 46 is preferably unplugged from its modem port (not shown) on the inside of the computer 18. Plug 50 is plugged into the port 52 as shown in FIG. 3 and collar 36 is slid over the cable 14 to abut against plug 50 as illustrated in FIG. 2. Once cable 14 has been plugged into the modem board 46, the modem board may be slid or otherwise positioned into place against the backplate 43 such that the ports 52 are accessible through slot 24 and the collar body 38 extends through the slot 42.

Modem board 46 is then plugged into the internal expansion slot (not shown) and secured to the backplate 43 such as by a screw 57 or other suitable fastener. It will be appreciated by a person of ordinary skill in the art that the insertion and positioning of the modem board will vary from computer to computer and the steps disclosed herein to install the lockout system of the present invention may have to be slightly modified accordingly as understood by a person of ordinary skill in the art. However, most computers will include the interface slots 24 for providing access to various interface cards in the computer.

After the cable 14 has been plugged in and the modem board 46 has been inserted into its designated slot, the backplate 43 is secured to case 22 and the rest of the assembly of computer 18 is concluded. The assembled computer 18 holds collar 36 and hinders the bypassing of the lockout system as discussed below.

Figure 4:
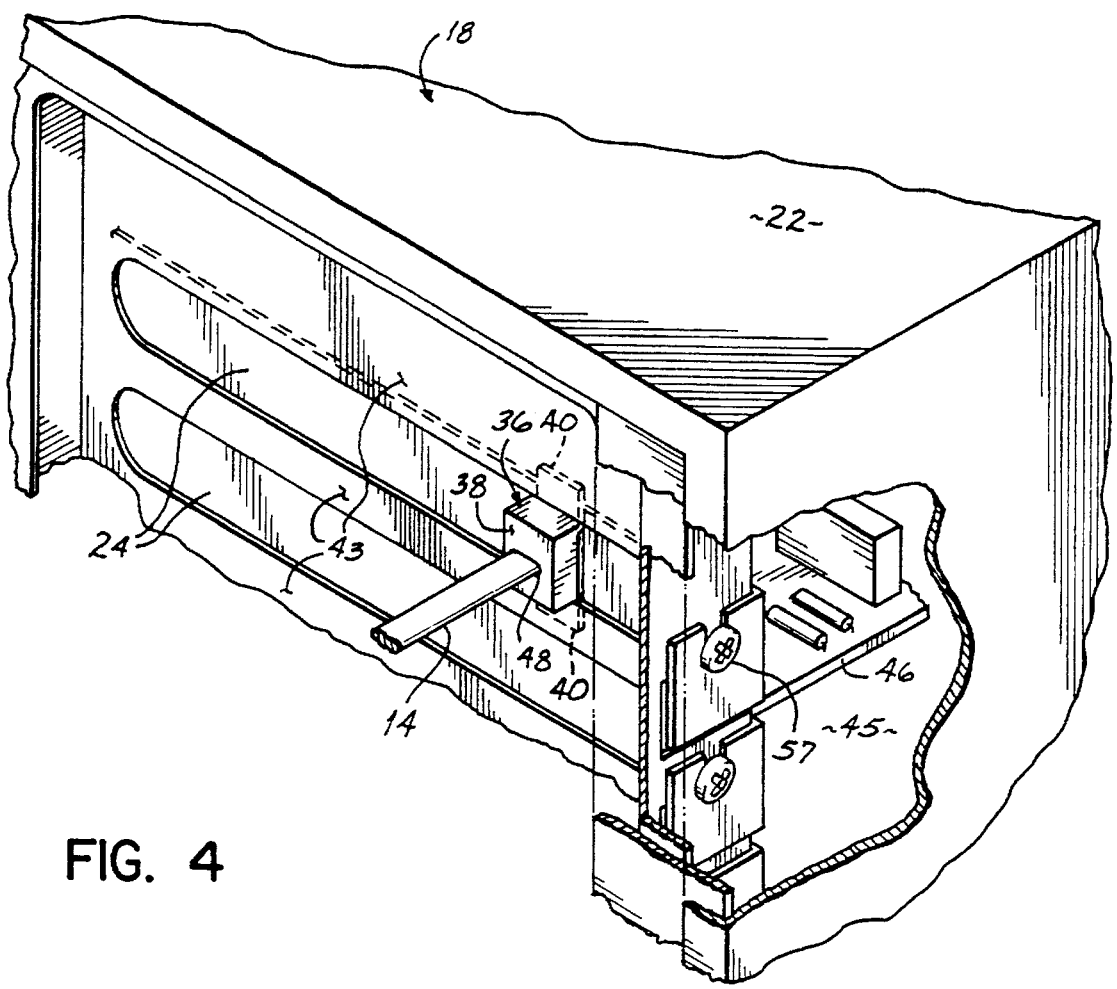
FIG. 4 is a perspective view of modem lockout system installed in a computer; and, FIG. 5 is a schematic view of an embodiment of a locking device for the lockout system for the invention.

Turning now to FIG. 4, the assembled computer is shown with the lockout system in place. Tabs 40 abut against an inside surface of backplate 43 proximate to the sides of slot 24. The opposing tabs 40 are effectively sandwiched between the modem board 46 and the backplate 43 thus holding collar 36 in position.

Collar 36 is constructed to effectively cover port 52 and cover plug 50 which is inserted therein. Specifically, collar 36 covers plug 50 and the securing structure 53 to prevent plug 50 from being unplugged and removed. In that way, cable 14 and locking device 12 may not be unplugged from the computer and replaced with a standard telephone line, thus bypassing the lockout system 10 of the invention.

Protective collar 36 is preferably formed of metal or rigid plastic and is coupled to cable 14. In one embodiment of the invention, protective collar 36 may be a unitary structure wherein the cable 14 is threaded through aperture 48 in 36 before the plug 50 is attached or before cable 14 is operably coupled with locking device 12. For example, the keyed switch 28 may have to be spliced into telephone cable 14, and the pre-spliced ends may be inserted through aperture 48 prior to assembly. In an alternative embodiment of the invention, the collar structure 36 might be of multi-part construction which might be snapped around cable 14, but not unsnappable. In any case, protective collar 36 will prevent unplugging of the plug 50 and effectively hinder a child from bypassing the lockout system 10. Protective collar 36 may only be easily removed by disassembling the computer case 22. Any attempt at disassembly will alert a parent or supervising adult that the child is trying to bypass the lockout system, and such efforts may then be stopped.

If any attempt is made to physically pull cable 14 from socket 52, the construction of collar 36 and its securement between modem card 46 and backplate 43 will maintain the plug within socket 52 and will only allow removal of the cable. In that case, the modem card port 52 will essentially be blocked from receiving another plug and Internet access will be prevented. Also, physically pulling cable 14 from the card 46 may even damage the card and tender it inoperable.

Referring again to FIG. 5, the keyed switch 28 is preferably surrounded by a rigid case which prevents tampering with the locking device 12. Preferably, the case 29 will be a metal or rigid plastic which is factory sealed so that the only access to the internal parts of the locking device will be to break or cut the case 29. Again, such destruction of the case will be a visual indication for an adult that the child is trying to bypass the lockout system 10.

As illustrated in FIG. 1, case 29 is preferably mounted on the side of the computer case 22 by means of Velcro™ or suitable adhesive (not shown) in order to be visible to an adult. Alternatively, if the computer case is constructed for receipt of the lockout system 10 of the invention, the locking switch 28 or other appropriate mechanism might be contained inside of the computer and only accessed by opening the case. Again, a child opening the case will provide a visual indication to an adult that a bypass operation is underway.

The lockout system 10 of the invention provides an inexpensive and easy-to-use tool for preventing unauthorized access to electronic information through on-line services. The locking device 12 of the invention may be actuated and deactuated, or locked and unlocked, as necessary to prevent Internet access or to provide adult supervised access. The lockout system does not affect the stand-alone operational capability of the computer, and therefore, a child may use the computer for other constructive tasks. The lockout system might be installed quickly and easily without a substantial modification to the computer equipment and the operation of the lockout system does not require that the adult be able to actually operate the computer. This is a particular advantage of the invention, as some adults will want to supervise their children without having to become computer experts themselves. Furthermore, the lockout system of the invention is not easily or readily overcome or bypassed by a child without blocking or ruining the modem card or alerting an adult that a bypass attempt is underway so that it may be stopped.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A lockout system for preventing children from accessing parentally-restricted and undesirable electronic information through an interface device of a computer comprising:

a signal cable operable for carrying electronic information and configured for being operably connected at one end with a signal port and at the other end with an interface device of a computer through an opening in a case of the computer, so electronic information may pass back and forth between the interface device and port;

a locking device operably coupled in-line with the signal cable, the locking device, when actuated, disabling the signal cable to prevent electronic information from passing between the interface device and port so that children cannot gain access to information prohibited by parents;

a protective collar couplable with the signal cable proximate said other end, the collar configured for engaging the computer body proximate the opening in said case and maintaining the other end of the signal cable in operable connection with the interface device to hinder a bypass of the lockout system.

2. The lockout system of claim 1 wherein the signal cable is a telephone cable operable for carrying modem signals and is configured for being connected between a telephone port and a modem to prevent access to prohibited information over a phone line.

3. The lockout system of claim 1 wherein the locking device includes a keyed switch which is opened and closed using a key structure, the switch disabling and enabling the signal cable.

4. The lockout system of claim 3 wherein the locking device includes an outer housing, a portion of the keyed switch being located inside of said housing to further hinder a child from bypassing the lockout system.

5. The lockout system of claim 1 wherein the protective collar includes a body having an aperture extending therethrough for receiving the signal cable, at least one tab extending from a side of the body for engaging the case proximate the opening and securing the collar with the case to maintain the signal cable operably connected with the interface device.

6. The lockout device of claim 5 wherein the case opening is in the shape of a slot, the tab of the collar configured for abutting the case proximate a side of the slot to secure the collar with the case.

7. A lockout system for preventing children from accessing parentally-restricted and undesirable electronic information through an interface device of a computer comprising:

a locking device configured for being operably coupled in-line with a signal cable extending between and connecting with a signal port at one end and the interface device at the other end, the locking device, when actuated, operable for disabling the signal cable to prevent electronic information from passing between the interface device and port so that children cannot gain access to information prohibited by parents;

a protective collar couplable with the signal cable proximate said other end, the collar configured for engaging a portion of the computer and maintaining the other end of the signal cable and locking device in operable connection with the interface device to hinder a bypass of the lockout system by a child.

8. The lockout system of claim 7 wherein the signal cable is a telephone cable operable for carrying modem signals and is configured for being connected between a telephone port and a modem to prevent access to prohibited information over a phone line.

9. The lockout system of claim 7 wherein the locking device includes a keyed switch which is opened and closed using a key structure, the switch disabling and enabling the signal cable.

10. The lockout system of claim 7 wherein the protective collar comprises a body having an aperture extending therethrough for receiving the signal cable, the collar body including a portion which engages the computer and prevents the signal cable from being disconnected from the interface device to hinder bypassing of the locking device.

11. The lockout system of claim 10 wherein the signal cable is connectable to the interface device through an opening in a case of the computer, the collar including at least one tab extending from a side of the collar body for engaging the computer case proximate the opening and securing the collar with the case to prevent disconnection of the signal cable.

12. The lockout device of claim 11 wherein the opening is in the shape of a slot, the tab of the collar configured for abutting the case proximate a side of the slot to secure the collar with the case.

13. A lockout system for preventing children from accessing parentally-restricted and undesirable electronic information through a modem device of a computer comprising:

a locking device configured for being operably coupled in-line with a telephone cable extending between and connecting with a telephone port and the modem device, the locking device, when actuated, operable for disabling the telephone cable to prevent electronic information from passing between the modem device and port so that children cannot gain access to information prohibited by parents;

a protective mount structure couplable with the telephone line, the mount structure configured for engaging a portion of the computer and preventing the telephone line from being easily disconnected from the modem device to hinder a bypass of the lockout system by a child.

14. The lockout system of claim 13 wherein the locking device includes a keyed switch which is opened and closed using a key structure, the switch enabling and disabling the telephone cable.

15. The lockout system of claim 13 wherein the protective mount structure comprises a body having an aperture extending therethrough for receiving the telephone cable, the collar body including a portion which engages the computer and prevents the telephone cable from being disconnected from the modem device to hinder bypassing of the locking device.

16. The lockout system of claim 15 wherein the telephone line is connectable to the modem device through an opening in a case of the computer, the mount structure including at least one tab extending from a side of the body for engaging the computer case proximate the opening and securing the collar with the case to prevent disconnection of the telephone cable.

17. The lockout system of claim 16 wherein the opening is in the shape of a slot, the tab of the mount structure configured for abutting the case proximate a side of the slot to secure the mount structure with the case.

18. The lockout system of claim 13 wherein the telephone line includes a plug which is inserted into a socket in the modem for connecting the line and the modem, the protective mount structure engaging the plug and computer simultaneously and preventing the line from being unplugged from the modem socket.

19. The lockout system of claim 13 wherein the computer includes a case having an opening therein for passage of the telephone cable to the modem, the protective mount structure engaging the computer case inside thereof and proximate the opening and preventing easy removal of the protective mount structure and disconnection of the telephone cable from outside of the case.

* * * * *